United States Patent
Cooney et al.

(10) Patent No.: US 12,056,715 B2
(45) Date of Patent: Aug. 6, 2024

(54) TECHNOLOGIES FOR DYNAMICALLY ASSESSING APPLICABILITY OF PRODUCT REGULATIONS TO PRODUCT PROTOCOLS

(71) Applicant: UL LLC, Northbrook, IL (US)

(72) Inventors: Alan Cooney, Northbrook, IL (US); Spencer Sharpe, Laramie, WY (US); Surekha Durvasula, Northbrook, IL (US); Christian Dorn Anschuetz, Johnsburg, IL (US)

(73) Assignee: UL LLC, Northbrook, IL (US)

( * ) Notice: Subject to any disclaimer, the term of this patent is extended or adjusted under 35 U.S.C. 154(b) by 409 days.

(21) Appl. No.: 16/403,057

(22) Filed: May 3, 2019

(65) Prior Publication Data
US 2020/0349584 A1 Nov. 5, 2020

(51) Int. Cl.
*G06Q 30/018* (2023.01)
*G06N 20/00* (2019.01)

(52) U.S. Cl.
CPC ........... *G06Q 30/018* (2013.01); *G06N 20/00* (2019.01)

(58) Field of Classification Search
CPC ...... G06Q 30/018; G06Q 10/10; G06Q 50/18; G06N 20/00
USPC ........................................................ 705/317
See application file for complete search history.

(56) References Cited

U.S. PATENT DOCUMENTS

| | | | |
|---|---|---|---|
| 6,745,146 B1 * | 6/2004 | Brown | G01R 31/12 702/123 |
| 7,124,101 B1 | 10/2006 | Mikurak | |
| 9,367,851 B2 | 6/2016 | Dale et al. | |
| 9,779,178 B2 | 10/2017 | Ghent | |
| 9,799,006 B2 | 10/2017 | Daulton et al. | |
| 9,959,367 B2 | 5/2018 | Ghent | |
| 10,248,981 B1 | 4/2019 | Dallas et al. | |
| 10,685,310 B1 | 6/2020 | McCuiston et al. | |
| 10,861,070 B2 | 12/2020 | Dika | |

(Continued)

FOREIGN PATENT DOCUMENTS

| | | |
|---|---|---|
| AU | 2019217235 A1 | 6/2020 |
| BE | 1025215 B1 | 12/2018 |

(Continued)

OTHER PUBLICATIONS

Badreddin, Omar, et al. "Regulation-based dimensional modeling for regulatory intelligence." 2013 6th International Workshop on Requirements Engineering and Law (RELAW). IEEE, 2013. (Year: 2013).*

(Continued)

*Primary Examiner* — John S. Wasaff
(74) *Attorney, Agent, or Firm* — MARSHALL, GERSTEIN & BORUN LLP

(57) ABSTRACT

Systems and methods for dynamically determining potentially applicability of product regulations to product protocols. According to certain aspects, an electronic device may access new or updated product regulations for various jurisdictions as well as product protocols associated with certain products. The electronic device may employ various data analyses technologies to determine which product regulations are potentially applicable to which product protocols. The electronic device may present information associated with the data analyses, and enable users to review information, further assess applicability, and make selections.

9 Claims, 12 Drawing Sheets

(56) References Cited

U.S. PATENT DOCUMENTS

| | | | |
|---|---|---|---|
| 10,867,268 B1 | 12/2020 | Kumar et al. | |
| 10,872,206 B2 | 12/2020 | Snyder et al. | |
| 10,962,965 B2 | 3/2021 | Cahill | |
| 2002/0059093 A1* | 5/2002 | Barton | G06Q 40/08 |
| | | | 705/7.39 |
| 2003/0069894 A1* | 4/2003 | Cotter | G06Q 10/10 |
| 2004/0139053 A1 | 7/2004 | Haunschild | |
| 2004/0177326 A1* | 9/2004 | Bibko | G06Q 10/10 |
| | | | 715/200 |
| 2005/0182695 A1 | 8/2005 | Lubow et al. | |
| 2006/0085238 A1* | 4/2006 | Oden | G06Q 10/063118 |
| | | | 705/7.17 |
| 2006/0178905 A1 | 8/2006 | Ayers et al. | |
| 2008/0040390 A1 | 2/2008 | Oves et al. | |
| 2008/0065401 A1* | 3/2008 | Abrahamson | G06Q 30/018 |
| | | | 705/317 |
| 2008/0172270 A1* | 7/2008 | Eckenroth | G06Q 10/0832 |
| | | | 705/333 |
| 2008/0222631 A1* | 9/2008 | Bhatia | G06F 11/3604 |
| | | | 717/178 |
| 2008/0281768 A1* | 11/2008 | Sadeh | G06Q 10/10 |
| | | | 706/47 |
| 2008/0313070 A1 | 12/2008 | Fell et al. | |
| 2009/0119141 A1* | 5/2009 | McCalmont | G06Q 10/06395 |
| | | | 705/7.41 |
| 2009/0241165 A1* | 9/2009 | Tyree | G06Q 10/06 |
| | | | 726/1 |
| 2010/0205208 A1* | 8/2010 | Walker | G06F 16/90335 |
| | | | 707/811 |
| 2011/0208662 A1* | 8/2011 | Haunschild | G06Q 10/10 |
| | | | 705/317 |
| 2011/0302171 A1* | 12/2011 | Waldo | G06F 16/93 |
| | | | 707/740 |
| 2012/0158446 A1 | 6/2012 | Mayerle et al. | |
| 2012/0323806 A1* | 12/2012 | Abrams | G06Q 10/063 |
| | | | 705/317 |
| 2013/0246291 A1* | 9/2013 | Dick | G06Q 10/00 |
| | | | 705/317 |
| 2013/0262484 A1 | 10/2013 | Kamat et al. | |
| 2014/0074513 A1 | 3/2014 | Bhatt et al. | |
| 2014/0337209 A1 | 11/2014 | Maiya et al. | |
| 2015/0019541 A1 | 1/2015 | Carus et al. | |
| 2015/0112813 A1* | 4/2015 | Cauthen | G06Q 30/0269 |
| | | | 705/14.66 |
| 2016/0092885 A1 | 3/2016 | Creager et al. | |
| 2016/0203494 A1* | 7/2016 | Galligan Davila | G06Q 30/018 |
| | | | 705/317 |
| 2016/0350885 A1* | 12/2016 | Clark | G06Q 30/0185 |
| 2017/0098257 A1 | 4/2017 | Keller | |
| 2017/0249642 A1 | 8/2017 | Burpulis et al. | |
| 2017/0249644 A1* | 8/2017 | DiMaggio | G06Q 30/018 |
| 2017/0249685 A1 | 8/2017 | Villa | |
| 2017/0286880 A1* | 10/2017 | Wiig | G06Q 10/067 |
| 2017/0330121 A1 | 11/2017 | Sullivan et al. | |
| 2018/0046972 A1 | 2/2018 | Sheth et al. | |
| 2018/0075554 A1* | 3/2018 | Clark | G06Q 50/18 |
| 2018/0130050 A1 | 5/2018 | Taylor et al. | |
| 2018/0260820 A1* | 9/2018 | Keating | G06Q 30/018 |
| 2018/0330455 A1* | 11/2018 | Bayyapu | G06Q 50/18 |
| 2019/0147456 A1* | 5/2019 | Hermans | G06Q 30/018 |
| | | | 705/317 |
| 2019/0172073 A1* | 6/2019 | Wiig | G06N 20/00 |
| 2020/0090059 A1* | 3/2020 | Kim | G06F 40/205 |
| 2020/0175110 A1* | 6/2020 | Snyder | G06F 40/279 |
| 2020/0357000 A1* | 11/2020 | Levine | G06N 5/045 |
| 2020/0372557 A1 | 11/2020 | Peters et al. | |
| 2021/0165400 A1 | 6/2021 | Cahill | |
| 2021/0174277 A1 | 6/2021 | Kumar et al. | |
| 2021/0182926 A1 | 6/2021 | Acharya et al. | |
| 2021/0312470 A1 | 10/2021 | Barlin | |

FOREIGN PATENT DOCUMENTS

| | | |
|---|---|---|
| BE | 1025240 B1 | 12/2018 |
| BE | 1025247 B1 | 12/2018 |
| BR | 112020014980 A2 | 12/2020 |
| CN | 110223030 A | 9/2019 |
| CN | 110310010 A | 10/2019 |
| CN | 110659818 A | 1/2020 |
| CN | 110659875 A | 1/2020 |
| CN | 110673828 A | 1/2020 |
| CN | 110737728 A | 1/2020 |
| CN | 111435240 A | 7/2020 |
| CN | 111465952 A | 7/2020 |
| CN | 112513901 A | 3/2021 |
| DE | 102020100874 A1 | 7/2020 |
| EP | 3692481 A1 | 8/2020 |
| EP | 3818478 A1 | 5/2021 |
| GB | 2 586 294 A | 2/2021 |
| JP | 2020113280 A | 7/2020 |
| JP | 7041963 B2 | 3/2022 |
| KR | 101720730 B1 | 3/2017 |
| SG | 11202003736 A | 5/2020 |
| TW | 202032442 A | 9/2020 |
| WO | WO-2019/156773 A1 | 8/2019 |
| WO | WO-2020/009670 A1 | 1/2020 |

OTHER PUBLICATIONS

Cleland-Huang, Jane, et al. "A machine learning approach for tracing regulatory codes to product specific requirements." Proceedings of the 32nd ACM/IEEE International Conference on Software Engineering-vol. 1. 2010. (Year: 2010).*

Eckert, T. (Nov. 2012). Strategies for tracking regulatory requirement changes. In 2012 IEEE Symposium on Product Compliance Engineering Proceedings (pp. 1-5). IEEE. (Year: 2012).* fdaatty.com, "FDA Atty, Food, Dietary Supplement, Medical Device Attorneys" (2015-2018). Retrieved from the Internet on Sep. 13, 2019: https://fdaatty.com/.

fda.gov, "Medical Device Safety, FDA" (Sep. 12, 2019). Retrieved from the Internet on Sep. 13, 2019: https://www.fda.gov/medical-devices/medical-device-safety.

oehha.ca.gov, "OEHHA, California Office of Environmental Health Hazard Assessment, Environmental Topics About Proposition 65," (Jun. 28, 2019). Retrieved from the Internet on Sep. 13, 2019: https://oehha.ca.gov/proposition-65.

Kensaq.com, "KensaQ Search," (2019) Ask Media Group, LLC. Retrieved from the Internet on Sep. 13, 2019: https://www.kensaq.com/web?qo=semQuery&ad=semA&q=california%20prop%2065&o=766195&ag=fw5&an=msn_s&rch=intl1437.

repositrak.com, "ReposiTrak The Speed Retail Platform" Proposition 65: What Is It and What's Changing?(Sep. 2019). Retrieved from the Internet on Sep. 13, 2019: https://repositrak.com/blog/proposition-65-what-is-it-and-whats-changing/?gclid=Cj0KCQjw2efrBRD3ARIsAEnt0egmXtXuEvSooE-jqKpAP3Xh6aKtvPVEWJMEr0nf6psISgP1RJI44LkaArszEALw_wcB.

assentcompliance.com, "Assent, Whitepaper Proposition 65: Understanding the Safe Drinking Water & Toxic Enforcement Act" (2019) Assent Compliance Inc. Retrieved from the Internet on Sep. 13, 2019: https://www.assentcompliance.com/assentu/resources/whitepaper/proposition-65-safe-drinking-water-and-toxic-enforcement-act/?sem_account_id=B041T1BB&sem_campaign_id=328794695&sem_ad_group_id=12633392243189063&sem_device_type=c&sem_keyword=california%20prop%2065&sem_matchtype=e&sem_ad_id=creative&sem_network=o&sem_target_id=kwd-78958985308717:loc-190&sem_feed_item_id=&utm_source=bing&utm_medium=cpc&utm_term=california%20prop%2065&sem_location_id=102956&sem_placement=placement&sem_placement_category=target&utm_campaign=TS:TX:NBR:US:REG:X:CA:Prop65:X:X&msclkid=1c28da84837c19f3a18c87fe238eadd8&utm_content=TS%3ATX%3ANBR%3AUS%3AREG%3AX%3AX%3AX%3ACAProp65%3AX%3AX%3AX%3AX.

(56) References Cited

OTHER PUBLICATIONS

"How AI and machine learning are revolutionizing quality control" Retrieved from https://www.ingedata.net/blog/ artificial-intelligence-and-quality-control (Year: 2018).
"Knowledge Graph", IBM Cloud Education, Apr. 12, 2021.
Balodi, Introduction of Latent Semantic Analysis (LSA) and Latent Dirichlet Allocation (LDA), Analytic Steps, downloaded from the Internet at: <https://www.analyticssteps.com/blogs/introduction-latent-semantic-analysis-lsa-and-latent-dirichlet-allocation-lda> (Oct. 22, 2019).
Joshi, Text Mining 101: A stepwise Introduction to Topic Modeling using Latent Semantic Analysis (using Python), Analytics Vidhya, downloaded from the Internet at: <https://www.analyticsvidhya.com/blog/2018/10/stepwise-guide-topic-modeling-latent-semantic-analysis/> (Oct. 1, 2018).
Landauer et al., Introduction to Latent Semantic Analysis, Discourse Processes, 25:259-84 (1998).

\* cited by examiner

TECHNOLOGIES FOR DYNAMICALLY ASSESSING APPLICABILITY OF PRODUCT REGULATIONS TO PRODUCT PROTOCOLS

FIELD

The present disclosure is directed to dynamically assessing applicability of product regulations to product protocols associated with items such as consumer products. More particularly, the present disclosure is directed to platforms and technologies for using various data analyses techniques to determine how products may be affected by applicable regulations based on specified product protocols.

BACKGROUND

The amount and scope of consumer products available for sale in the marketplace is constantly changing as new products are introduced and existing products are improved or modified. In particular, product manufacturers, distributors, and the like will consistently release new products and update existing products to meet consumer demand and to compete with other manufacturers, distributors, and the like. Generally, a product is specified according to a product protocol which defines or describes the product, features thereof, brand claims, and/or other aspects, and serves to describe the differentiators of the product.

The introduction and sale of products into the marketplace is subject to governance in the form of regulations, laws, and standards. Typically, different jurisdictions (e.g., federal, state, county, etc.) have different regulations for different products. For example, California may have a different regulation for a product with a lithium-ion battery than a regulation of Texas. However, in addition to defining different requirements, regulations are often not consistent in terminology, scope, terminology, and applicability, among other inconsistencies. Additionally, product protocols are not consistent in breadth and terminology, among other inconsistencies. Therefore, entities associated with products (e.g., retailers, manufactures, suppliers, etc.) are not able to effectively determine which regulations may be applicable for certain products, especially new or updated products. Additionally, there is a long lead time between the product protocol being defined and the product being manufactured and delivered, during which existing regulations may be modified and/or new regulations introduced.

Accordingly, there is an opportunity for platforms and technologies that effectively and efficiently determine applicability of regulations to products.

SUMMARY

In an embodiment, a computer-implemented method for dynamically determining product regulations that are applicable to product protocols is provided. The method may include: accessing, by a processor, a set of product regulations; storing, in memory, the set of product regulations; accessing, by the processor, a set of product protocols for a set of products, wherein each product protocol of the set of product protocols comprises content descriptive of a corresponding product of the set of products; analyzing, by the processor for each product protocol of the set of product protocols, the content descriptive of the corresponding product to determine whether at least one product regulation of the set of product regulations is potentially applicable to the product protocol; and displaying, in a user interface, a result of the analyzing.

In another embodiment, a system for dynamically determining product regulations that are applicable to product protocols is provided. The system may include a memory storing instructions; a user interface; and a processor interfaced with the memory and the user interface. The processor may be configured to execute the instructions to cause the processor to: access a set of product regulations, cause the memory to store the set of product regulations, access a set of product protocols for a set of products, wherein each product protocol of the set of product protocols comprises content descriptive of a corresponding product of the set of products, analyze, for each product protocol of the set of product protocols, the content descriptive of the corresponding product to determine whether at least one product regulation of the set of product regulations is potentially applicable to the product protocol, and cause the user interface to display a result of the analyzing.

In a further embodiment, a non-transitory computer-readable storage medium having stored thereon a set of instructions, executable by a processor, for dynamically determining product regulations that are applicable to product protocols is provided. The instructions may include: instructions for accessing a set of product regulations; instructions for storing, in memory, the set of product regulations; instructions for accessing a set of product protocols for a set of products, wherein each product protocol of the set of product protocols comprises content descriptive of a corresponding product of the set of products; instructions for analyzing, for each product protocol of the set of product protocols, the content descriptive of the corresponding product to determine whether at least one product regulation of the set of product regulations is potentially applicable to the product protocol; and instructions for displaying, in a user interface, a result of the analyzing.

BRIEF DESCRIPTION OF THE FIGURES

FIGS. 2A-2D depict example interfaces associated with reviewing product protocols and product regulations, in accordance with some embodiments.

FIGS. 3A-3E depict example interfaces associated with reviewing product protocols and product regulations, in accordance with some embodiments.

DETAILED DESCRIPTION

Figure 1A:
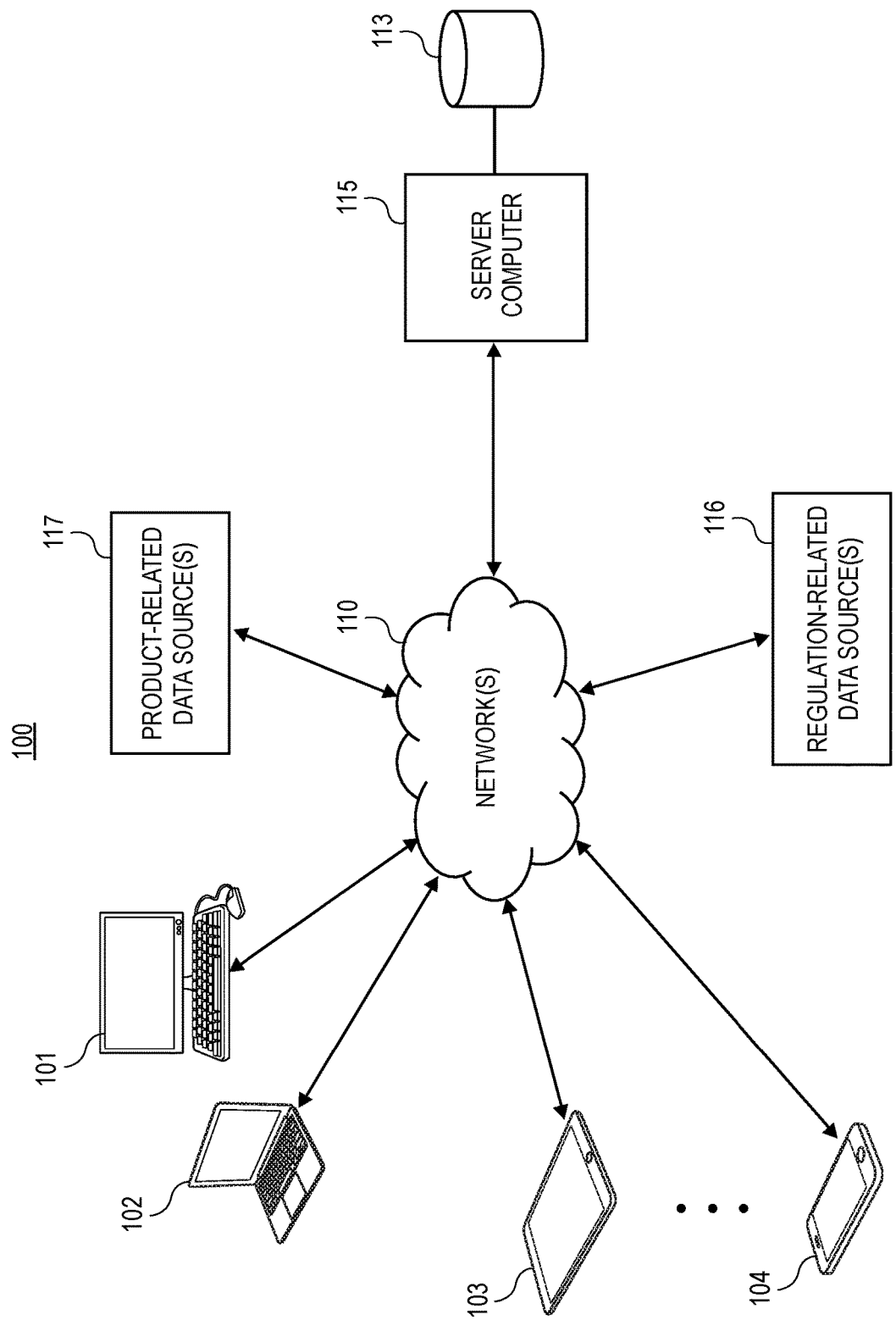
FIG. 1A depicts an overview of components and entities associated with the systems and methods, in accordance with some embodiments.

The present embodiments may relate to, inter alia, platforms and technologies for dynamically assessing applicability of product regulations to product protocols. According to certain aspects, systems and methods may receive or otherwise access information indicative of product regulations, and may organize and store the information as part of a machine learning model or other data organization structure. The systems and methods may additionally receive or access information indicative of product protocols, such as descriptions of products that are in the marketplace or contemplated being in the marketplace.

The systems and methods may analyze the information indicative of the product protocols, with reference to the product regulation information, to determine what regulations may be applicable to the associated products. The systems and methods may analyze the information using any stored data model(s) or according to other data analyses techniques. The systems and methods may present information that indicates the potentially-applicable regulations for review, selection, and/or correction by certain users. In embodiments, the interaction with the presented information by the users may be captured and input into the machine learning model to increase the accuracy of subsequent regulation assessments and determinations. Additionally, the feedback from users may be used to assess the quality of the regulatory assessments, thus enabling contextualization to the target environment, marketplace, or audience.

The systems and methods therefore offer numerous benefits. In particular, the use of various data analyses such as machine learning techniques enable the systems and methods to accurately and dynamically assess regulation applicability. Additionally, entities such as companies and corporations associated with a product lifecycle are afforded the benefit of being able to review regulations that are potentially applicable to products that the entities intend to release or introduce. Accordingly, the entities may make necessary adjustments or modifications to the products or to the release/introductions of the products, to comply with the applicable regulations. Additionally, consumers would benefit from products that comply with regulations and that experience a reduced amount of product recalls. It should be appreciated that additional benefits are envisioned.

The systems and methods discussed herein address a challenge that is particular to supply chain management. In particular, the challenge relates to a difficulty in accurately and effectively assessing which product regulations may be applicable to products before the introduction of the products, especially because of inconsistencies between and among product protocols and product regulations. Conventionally, individuals must manually review product regulations to determine applicability to products. However, these conventional methods are often time consuming, ineffective, and/or expensive. Additionally, the individuals may not have access to up-to-date regulations. The systems and methods offer improved capabilities to solve these problems by dynamically and accurately assessing regulation applicability based on up-to-date information and machine learning techniques. Further, because the systems and methods employ communication between and among multiple devices, the systems and methods are necessarily rooted in computer technology in order to overcome the noted shortcomings that specifically arise in the realm of supply chain management.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103, 104. Each of the electronic devices 101, 102, 103, 104 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103, 104 may be an electronic device associated with an entity such as a company, business, corporation, or the like (e.g., a server computer or machine).

Each of the electronic devices 101, 102, 103, 104 may be used by any individual or person (generally, a user). According to embodiments, the user may use the respective electronic device 102, 102, 103, 104 to input information associated with a product(s). The product(s) may be offered for sale or otherwise made available for purchase or use by a business, company, service provider, or the like. Alternatively or additionally, the business, company, service provider, or the like may be contemplating offering the product for sale or purchase. In embodiments, the information may represent an iteration, update, or new version of the product(s).

Generally, the information for each product may be in the form of a product protocol that may include a product definition(s), a product requirement(s), a product deliverable(s), and/or other information. The product protocol may be prepared or developed before or after a product concept is decided, before or after concept testing is completed, and/or before or after preliminary sales have been forecasted. The product protocol may be based on estimates of market and/or consumer need, testing with target market customers and feedback relating thereto, initial sales projections, estimates of advertising and marketing expenditure to launch a product, and/or estimates of production cost, and may include information describing dimensions, component parts or ingredients, assembly or installation information, electrical requirements or guidelines, operation requirements or guidelines, and/or other information. Additionally, the product protocol may include information about usage conditions, ideal applications, ideal environmental conditions of operation, and usage exceptions that restrict the use of a product to certain types of operators or require a special environment in which to operate the product safely. Although the embodiments discuss protocols for products, it should be appreciated that the systems and methods, and functionalities thereof, may extend to services offered by businesses, companies, service providers, or the like.

As an example, a product protocol for a child scooter may identify the dimension of the scooter in various configurations, the component parts and materials thereof of the scooter, and assembly instructions. As an additional example, a product protocol for a light bulb with wireless network connection capabilities may identify the electrical requirements, wattage output, supported communication protocols, and component materials.

According to embodiments, each product protocol for each product may be manually generated by an individual or user and input into one of the electronic devices 101, 102, 103, 104 (or another electronic device), automatically generated by one of the electronic devices 101, 102, 103, 104 (or another electronic device), or a combination thereof. Further, each product protocol may include any textual (i.e., alphanumeric) content, media content (e.g., audio, video, images, etc.), or a combination thereof.

The electronic devices 101, 102, 103, 104 may communicate with a server computer 115 via one or more networks 110. The server computer 115 may be associated with an entity such as a company, business, corporation, or the like, which markets, manufactures, or sells the product, or is otherwise involved in the supply chain of the product. In embodiments, the electronic devices 101, 102, 103, 104 may transmit or communicate, via the network(s) 110, information associated with product protocols to the server computer 115.

In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102, 103 and the server computer 115.

In alternative or additional implementations, the server computer 114 may communicate with one or more product-related data sources 117. According to embodiments, the product-related data sources(s) 117 may alternatively or additionally receive, access, and/or store various product protocols. Additionally, the product-related data source(s) 117 may be associated with businesses, companies, service providers, or the like, that may have an agreement, partnership, or contract with an entity associated with the server computer 115, and that offer or contemplate offering various products. Generally, when a business, company, service provider, or the like issues or new or updated product protocol, the corresponding product-related data source 117 may push or otherwise send the new or updated product protocol to the server computer 115, or the server computer 115 may pull or retrieve the new or updated product protocol from the corresponding product-related data source 117. Accordingly, the server computer 115 may store the most up-to-date product protocols issued by the participating businesses, companies, services providers or the like.

The server computer 114 may additionally communicate with a regulation-related data source(s) 116. According to embodiments, the regulation-related data source(s) 116 may be associated with various regulatory bodies or agencies that may set or institute product regulations. For example, the regulation-related data source(s) 116 may be associated with the U.S. Consumer Product Safety Commission (CPSC), the U.S. Environmental Protection Agency (EPA), the U.S. Federal Aviation Administration (FAA), the U.S. Federal Communications Commission (FCC), the U.S. Food and Drug Administration (FDA), the U.S. Federal Trade Commission (FTC), the U.S. National Highway Traffic Safety Administration (NHTSA), the U.S. Nuclear Regulatory Commission (NRC). The regulatory bodies or agencies may be any combination of federal-level, state-level, municipal-level, local-level, foreign, or other level of regulatory bodies or agencies. Generally, when a regulatory body or agency issues or new or updated product regulation, the corresponding regulation-related data source 116 may push or otherwise send the new or updated product regulation to the server computer 115, or the server computer 115 may pull or retrieve the new or updated product regulation from the corresponding regulation-related data source 116. Accordingly, the server computer 115 may store the most up-to-date product regulations issued by the participating regulatory bodies or agencies.

According to embodiments, the server computer 115 may employ various machine learning techniques, calculations, algorithms, and the like to generate and maintain a machine learning model associated with regulations and protocols for a set of products. The server computer 115 may initially train the machine learning model using a set of training data, or may not initially train the machine learning model. The server computer 115 may analyze any product protocol information received from the electronic devices 101, 102, 103, 104 and/or the product-related data source(s) 117, for example using the machine learning model, to determine any regulations that may apply to the corresponding product(s). The server computer 115 may avail the result(s) of the analysis (e.g., by presenting the result(s) in a user interface) for review and further selection by a user of the server computer 115. These functionalities are further described with respect to FIG. 1B.

The server computer 115 may be configured to interface with or support a memory or storage 113 capable of storing various data, such as in one or more databases or other forms of storage. According to embodiments, the storage 113 may store data or information associated with any machine learning models that are generated by the server computer 115, any product regulation information received from the regulation-related data sources 116, or any product protocol information received from the electronic devices 101, 102, 103, 104 or from the product-related data source(s) 117. Additionally, the server computer 115 may store data associated with the review of regulations determined to potentially be applicable to products.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103, 104 interface with the server computer 115, the electronic devices 101, 102, 103, 104 may actually interface with one or more of a number of distributed computers, servers, machines, or the like, to facilitate the described functionalities.

Figure 1B:
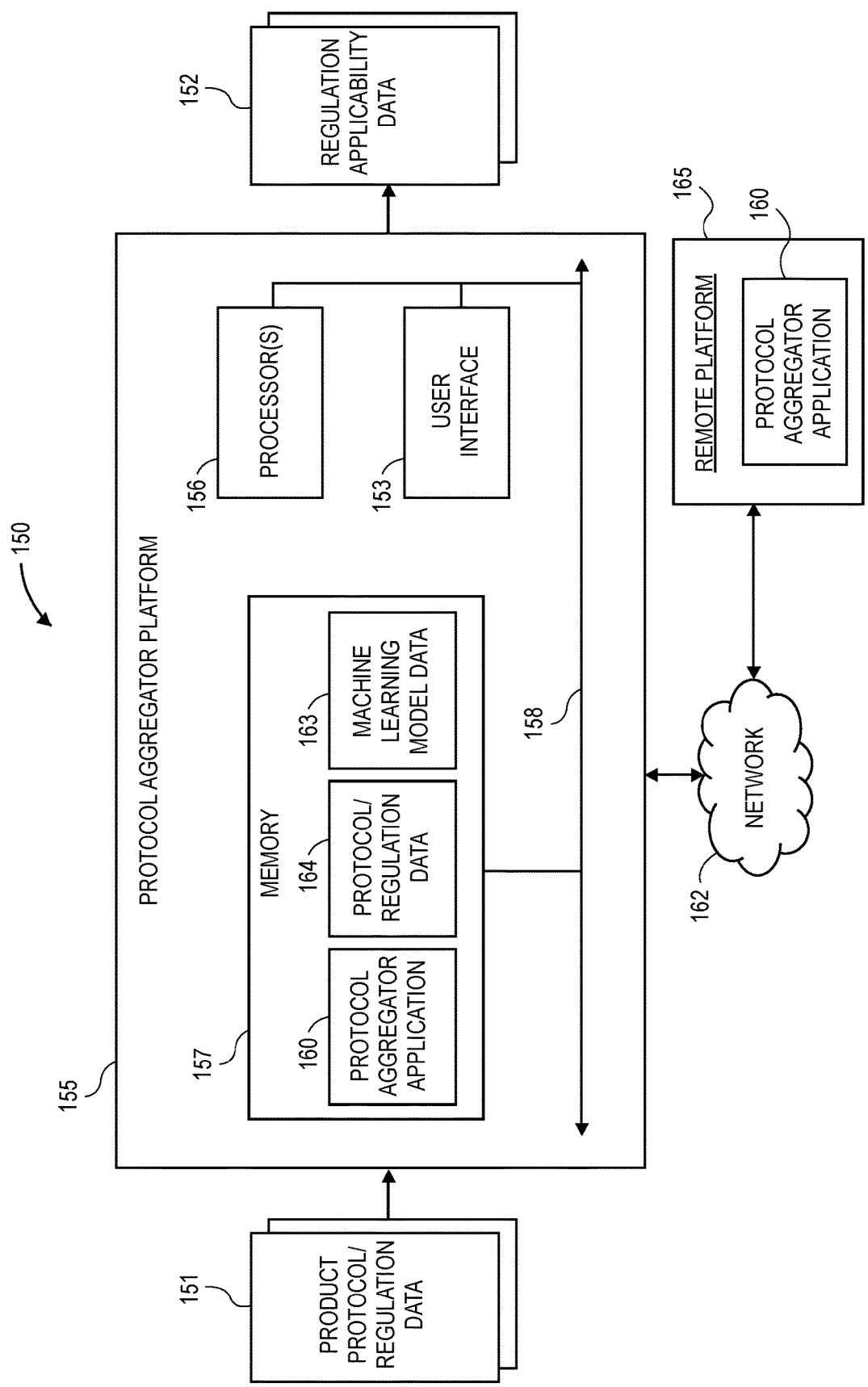
FIG. 1B depicts an overview of certain components configured to facilitate the systems and methods, in accordance with some embodiments.

Although four (4) electronic devices 101, 102, 103, 104, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which product protocol and regulation data 151 is processed into regulation applicability data 152 via a protocol aggregator platform 155, according to embodiments. The protocol aggregator platform 155 may be implemented on any computing device, including the server computer 115 (or in some implementations, one or more of the electronic devices 101, 102, 103, 104) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The protocol aggregator platform 155 may further include a user interface 153 configured to present content (e.g., information associated with product protocols and potentially applicable product regulations). Additionally, a user may make selections to the content via the user interface 153, such as to navigate through different information, select and review applicable product regulations, select whether product regulations are applicable, and/or other actions. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a protocol aggregator application 160), data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The protocol aggregator platform 155 may operate in a networked environment and communicate with one or more remote platforms, such as a remote platform 165, via a network(s) 162, such as a local area network (LAN), a wide area network (WAN), telecommunications network, or other suitable network. The platform 165 may be implemented on any computing device, including one or more of the electronic devices 101, 102, 103, 104 or the server computer 115 as discussed with respect to FIG. 1A, and may include many or all of the elements described above with respect to the platform 155. In some embodiments, as will be described herein, the protocol aggregator application 160 as will be further described herein may be stored and executed by the remote platform 165 instead of by or in addition to the platform 155.

The protocol aggregator platform 155 may store, as protocol and regulation data 164, any information associated with product protocols and product regulations, such as the received product protocol and regulation data 151. Additionally, the protocol aggregator application 160 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, latent semantic analysis, Bayesian networks, or the like. Generally, the protocol aggregator platform 155 may support various supervised and/or unsupervised machine learning techniques. Additionally, the protocol aggregator platform 115 may employ topic modeling and clustering of the protocol and regulation data 164, which may enable the vast and diverse set of regulations to be narrowed to a more relevant set of regulations that may be applicable to the product. In an embodiment, the protocol aggregator application 160 may initially training a machine learning model with training data, and store the resulting machine learning model as machine learning model data 163. In another embodiment, the protocol aggregator application 160 may generate and update the machine learning model, and the corresponding machine learning model data 163, based on the received product protocol and regulation data 151, and in some cases may generate the machine learning model using various unsupervised training techniques, such as clustering or cluster analysis and could also take "guidance" information from subject matter experts (SME) which could augment the resulting data with qualifying metadata or contextual information.

According to embodiments, when the data 151 includes a product protocol for a product, such as for a new or updated product, the protocol aggregator application 160 may analyze the data 151 to determine what, if any, of the product regulations may apply to the product. In analyzing the data 151, the protocol aggregator application 160 may use any combination of the protocol and regulation data 164 and the machine learning model data 163. In an implementation, the protocol aggregator application 160 may tokenize the language of the product protocol and compare the resulting tokens to the content of the product regulations to identify similarities. The level of similarity between the tokens and the content of the product regulations may be modified so as to adjust the sensitivity of the analysis. Based on the identified similarities, the protocol aggregator application 160 may determine which of the product regulations may apply to the product, as well as a respective confidence level of the applicability for each identified product regulation.

In another implementation, the protocol aggregator application 160 may generate a set of vectors based on the content of the product protocol, where the protocol aggregator application 160 may analyze the set of vectors in combination with the machine learning model data 163 to determine which of the product regulations may apply to the product, as well as a respective confidence level for each identified product regulation. The results of any analyses by the protocol aggregator application 160 may be embodied as the regulation applicability data 152.

As an example, a product protocol for a mattress may describe the dimensions and materials of the mattress, as well as various testing results and beneficial features of the mattress. However, the product protocol may not mention anything about the fire retardant capability of the mattress and/or its materials. In certain jurisdictions or areas, mattresses are required to comply with certain flame retardant regulations. When the protocol aggregator application 160 analyzes the product protocol for the mattress, the protocol aggregator application 160 may not only identify product regulations that may be applicable to the mattress itself, but also product regulations that may be applicable to flame retardant capabilities of the mattress. In particular, the protocol aggregator application 160 may determine that the mattress includes a foam material, and may determine, from the protocol and regulation data 164, that mattresses having a foam material may be subject to a certain flame retardant regulation. Accordingly, the protocol aggregator application 160 may present the certain flame retardant regulation for user review even though the product protocol does not mention any flame retardant capabilities and even though the entity associated with the mattress may not know that the mattress is subject to flame retardant regulations.

After identifying potentially applicable product regulations for a product based on the product protocol, the protocol aggregator application 160 may add, to the machine learning model, the results from the analysis so that the protocol aggregator application 160 may use the updated machine learning model in subsequent regulation applicability determinations. In embodiments, results from an internal or manual review of the regulation applicability analysis may additionally or alternatively be used to update the machine learning model.

The protocol aggregator application 160 (or another component) may cause the regulation applicability data 152 (and, in some cases, the originally-received data 151) to be displayed on the user interface 153 for review by the user of the protocol aggregator platform 155. The user may select to review and/or modify the displayed data. For instance, a user may review a product protocol in comparison to the potentially applicable product regulations, and select which of the product regulations are actually applicable, which may be to contextualize to a vision of the target marketplace, market segment, or audience. For instance, if a product protocol is associated with a launch of a set of headphones in the United States, and the potentially applicable product regulations include a noise output regulation applicable to the United States and a comparable regulation applicable to China, the user may select the United States regulation as applicable and the China regulation as not applicable. The protocol aggregator application 160 may update the data model stored in the machine learning model data 163 to reflect any selections made by the user, for subsequent use by the protocol aggregator application 160.

In general, a computer program product in accordance with an embodiment may include a computer usable storage medium (e.g., standard random access memory (RAM), an optical disc, a universal serial bus (USB) drive, a big data processing engine, a NoSQL repository, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources. Generally, each of the data 151 and the data 152 may be embodied as any type of electronic document, file, template, etc., that may include various textual content and, for the data 152, an identification of the potentially applicable product regulations for a given product, and may be stored in memory as program data in a hard disk drive, magnetic disk and/or optical disk drive in the protocol aggregator platform 155 and/or the remote platform 165.

FIGS. 2A-2D and 3A-3E depict example interfaces associated with the systems and methods. In embodiments, the interfaces may be displayed by a computing device in a user interface, such as the user interface 153 as discussed with respect to FIG. 1B. Additionally, the interfaces may be accessed and reviewed by a user of the platform (e.g., the platform 155), where the user may make selections, submit entries or modifications, or facilitate other functionalities.

Figure 2A:
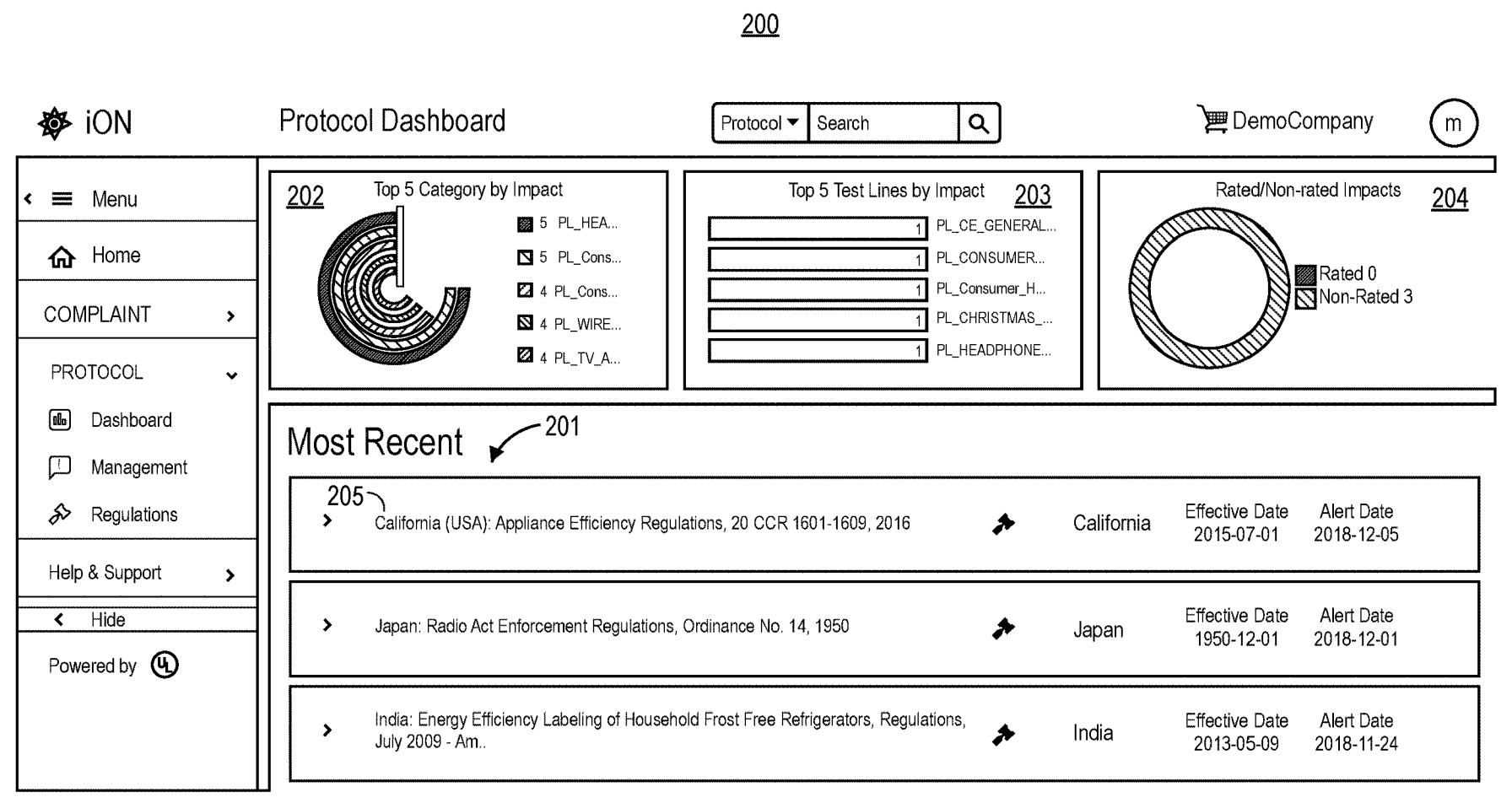

FIG. 2A depicts an interface 200 associated with the systems and methods. In particular, the interface 200 depicts a set of regulations 201 having recent updates (as shown: Appliance Efficiency Regulations of California, Radio Act Enforcement Regulations of Japan, and Energy Efficiency Labeling of Household Frost Free Refrigerators, Regulations of India). Each of the set of regulations 201 has an effective date (i.e., when the regulation itself became effective) and an alert date (i.e., when the regulation was updated).

The interface 200 further indicates a set of product categories 202 (as shown: general use headphones, consumer power refrigerators, consumer hair dryers, wireless devices, and TV antennas) and a set of test lines 203 (as shown: general consumer electronics in the United States, consumer hair clippers in the United States, consumer hair dryers in India, Christmas lights in the United States, and headphones in China) that may be impacted by or applicable to the set of regulations 201. Additionally, the interface 200 includes a chart 204 identifying rated impacts and non-rated impacts.

Figure 2B:

The interface 200 enables a user to select to view additional regulations, in which case the computing device may display an interface 210 as depicted in FIG. 2B. The interface 210 enables the user to select various filters, including a date range 211, an applicable country 212 (i.e., view regulations specific to specific countries) 212, and a type(s) of products covered by the regulations 213. Additionally, the interface 210 enables the user to sort by an alert date 214.

Figure 2C:
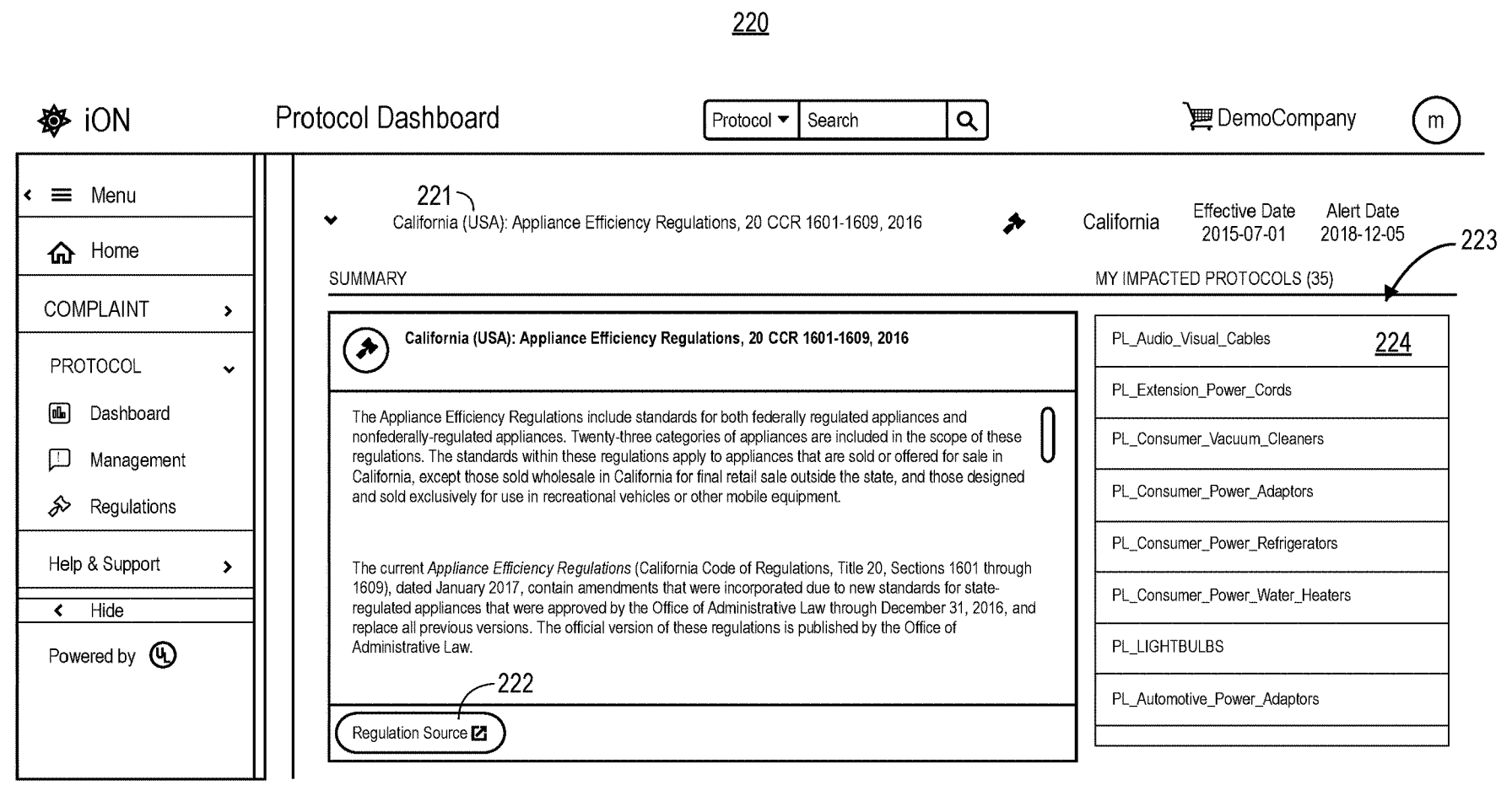

The interface 200 further enables the user to select specific regulations of the set of regulations 201 to review additional information. For example, the user may select the Appliance Efficiency Regulation 205, in which case the computing device may display an interface 220 as depicted in FIG. 2C. The interface 220 may include a summary 221 of the selected regulation and a selection 222 to view the source of the regulation. Additionally, the interface 220 may include a set of protocols 223, each of which is impacted by or potentially impacted by the selected regulation.

Figure 2D:
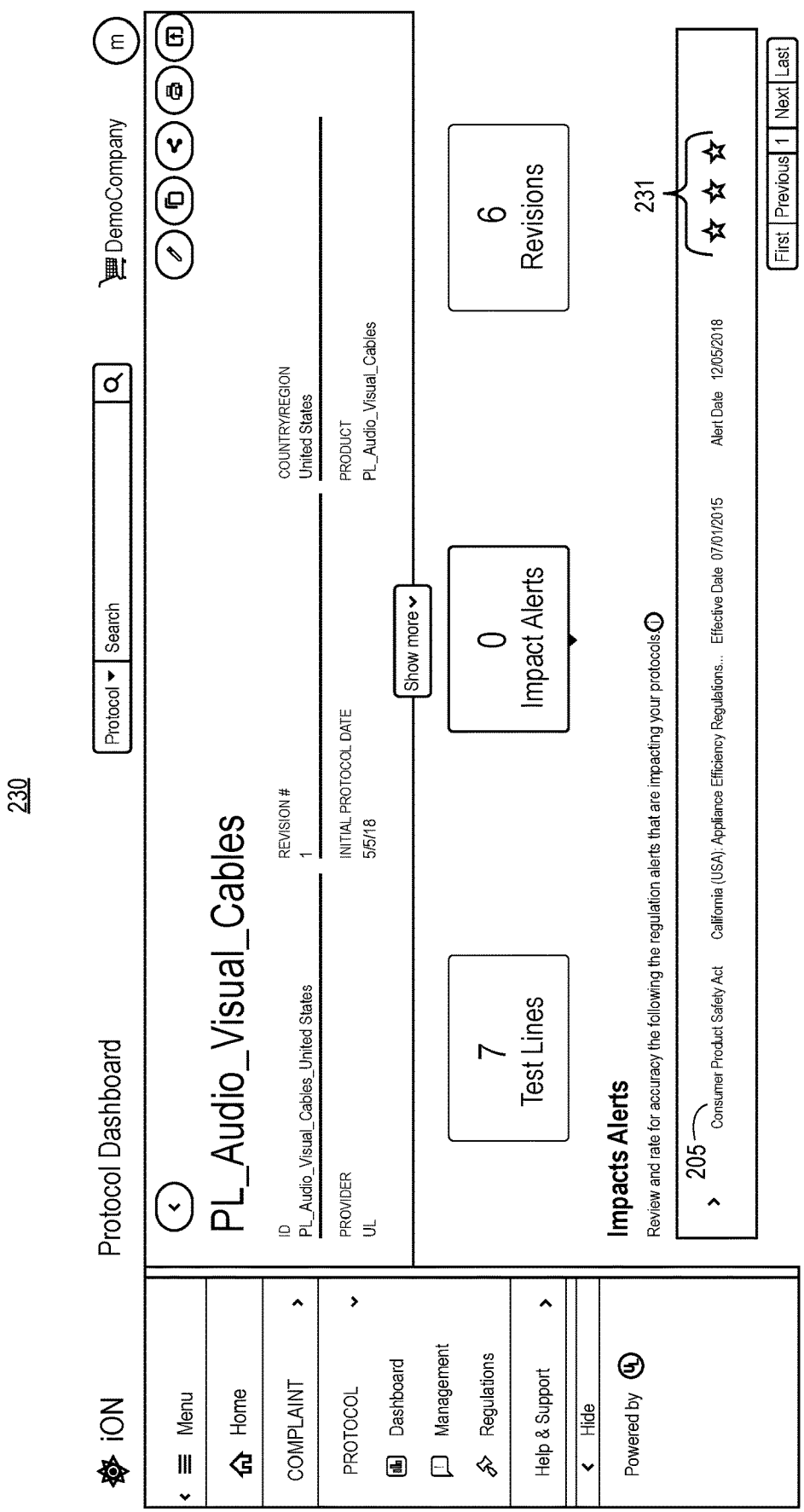

One of the set of protocols 223 may be a protocol 224 for audio visual cables. The user may select the protocol 224, in which case the computing device may display an interface 230 as depicted in FIG. 2D. The interface 230 may including various information identifying and describing the protocol. Additionally, the interface 230 may indicate the Appliance Efficiency Regulation 205 which may be applicable to the protocol 224, and may enable the user to select whether the Appliance Efficiency Regulation 205 is actually applicable to the protocol 224. For example, the interface 230 may include a star rating system 231 where the user may select one (1) star if the protocol 224 is not impacted by the regulation 205 and three (3) stars if the protocol 224 is impacted by the regulation 205. The computing device may associate, in memory, the selected rating with the regulation 205 and with the protocol 224. The user may select and rate the regulation applicability of any of the remaining protocols in the set of protocols 223 depicted in FIG. 2C.

Figure 3A:

FIG. 3A depicts an interface 300 associated with the "Management" feature of the protocol aggregator platform. The interface 300 may include a set of protocols 301 that a user may select to review and assess regulation applicability, among other actions. The interface 300 enables the user to select various filters for the set of protocols 301, including a date range 303, an applicable country or region (i.e., view protocols specific to specific countries/regions) 304, and a type(s) of products covered by the protocols 306. As an example, the user may select to review a protocol 302 associated with consumer audio and video equipment in Australia, in which case the computing device may display an interface 310 as depicted in FIG. 3B.

Figure 3B:
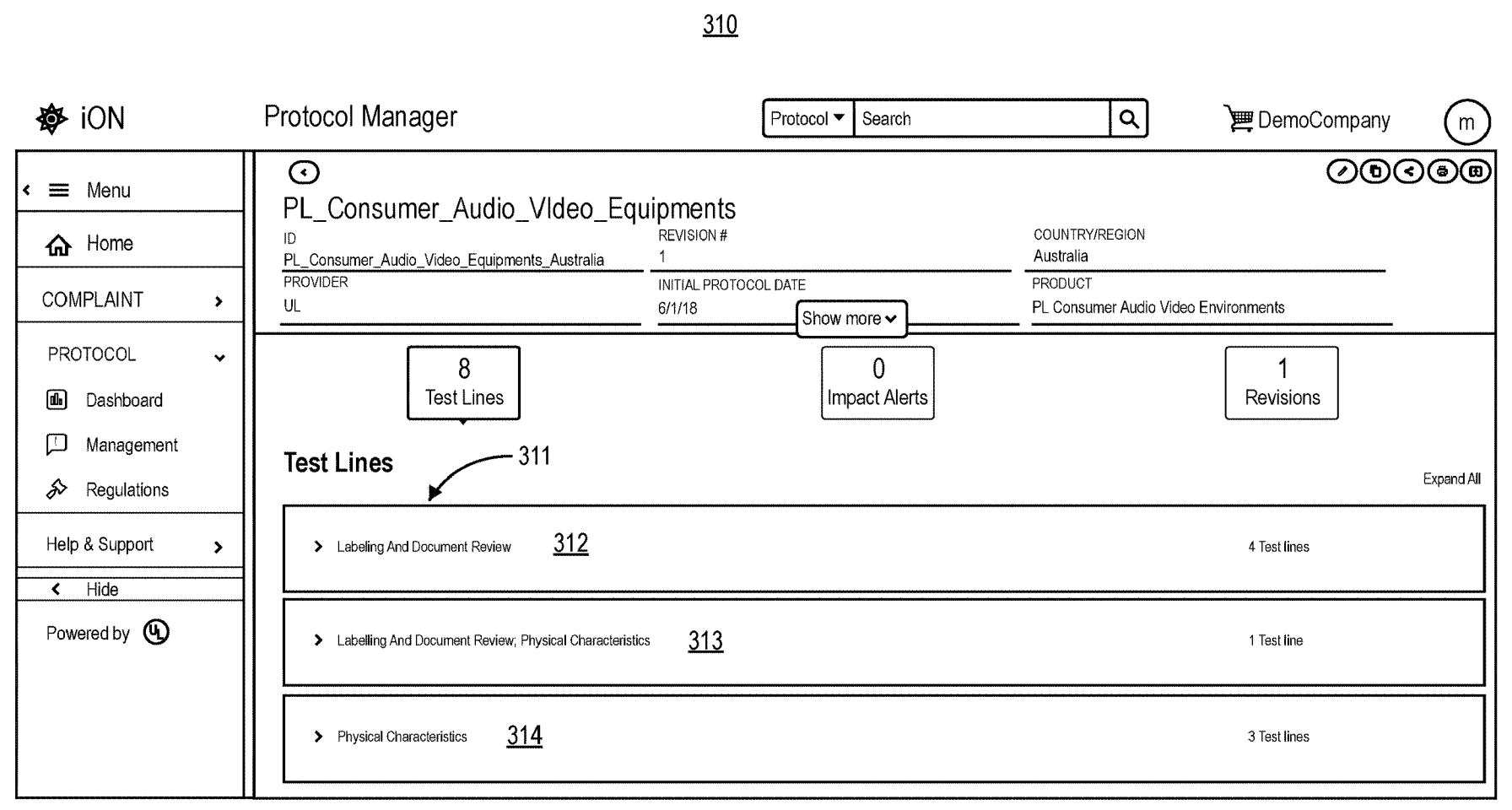

The interface 310 of FIG. 3B identifies a set of categories 311 (as shown: labeling and document review 312, physical characteristics of labeling and document review 313, and physical characteristics 314) for a set of test lines having various applicable regulations. In response to the user selecting the labeling and document review 312 category, the computing device may display an interface 320 as depicted in FIG. 3C.

Figure 3C:
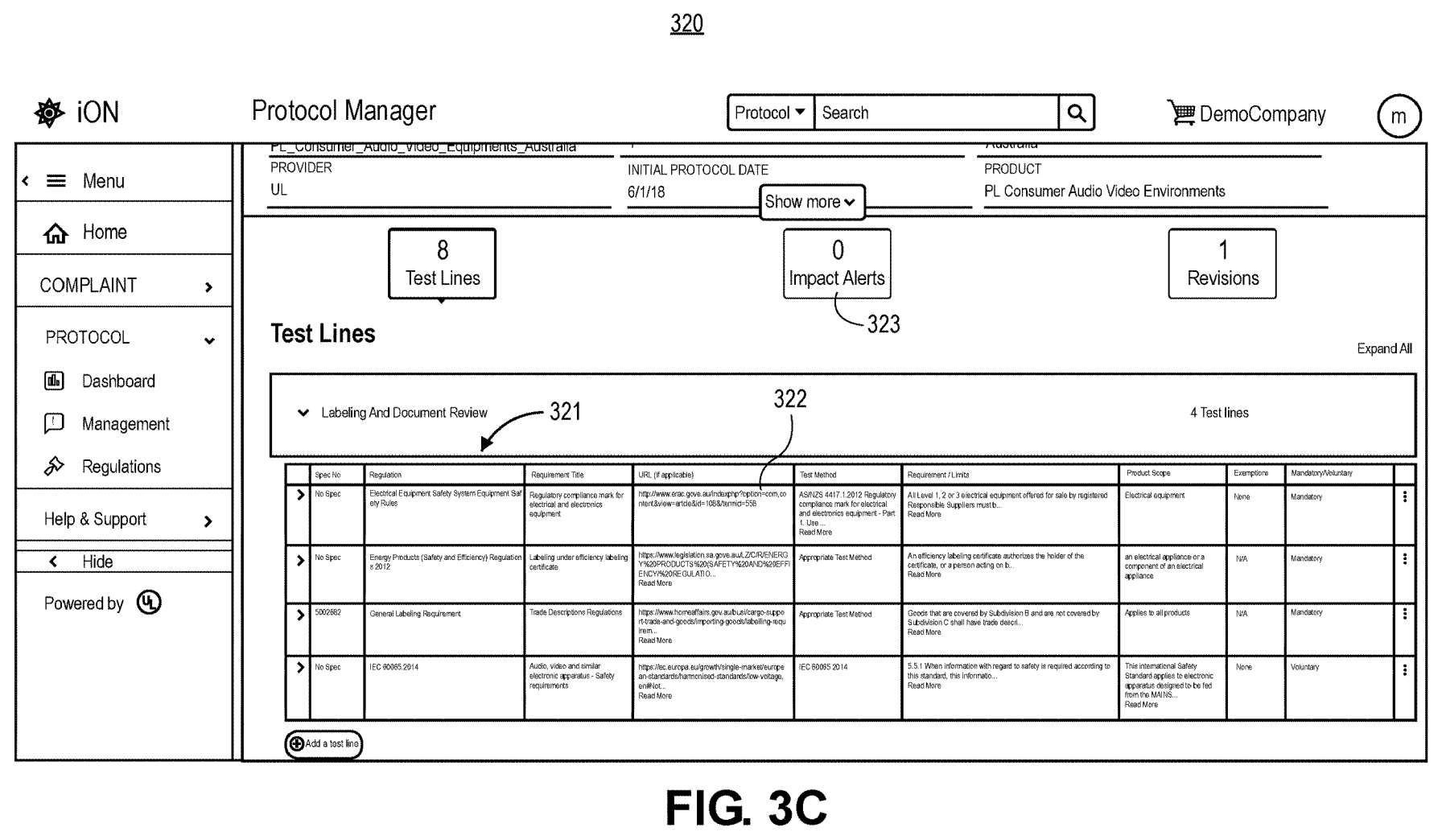

The interface 320 of FIG. 3C identifies a set of regulations 321 that are deemed applicable to the labeling and document review 312 category. The user may make various selections in the interface 320 to review certain information. For example, the user may select a URL 322 of the Electrical Equipment Safety System Equipment Safety Rules of Australia to review the content of that regulation. The interface 320 further includes an impact alerts selection 323 that enables the user to select an applicability of a set of regulations that are not yet deemed applicable to the selected protocol. In the interface 320 depicted in FIG. 3C, there are not any regulations for which an applicability determination is needed.

Figure 3D:
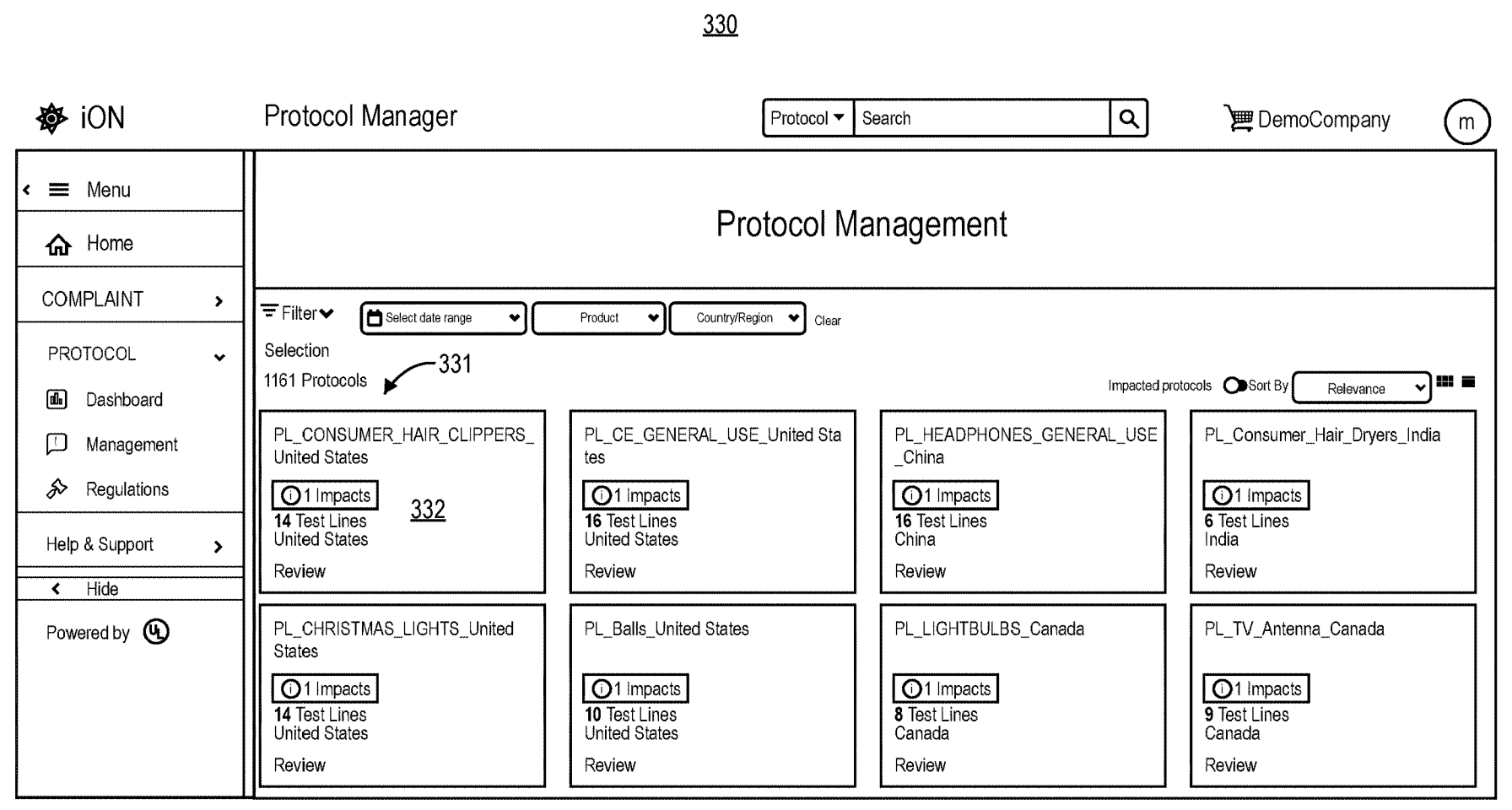
Figure 3E:

The interface 300 of FIG. 3A may further include a selection 305 to filter impacted protocols, where in response to a user selecting the selection 305, the computing device may display an interface 330 as depicted in FIG. 3D. The interface 330 may identify a set of protocols 331 that are potentially impacted by certain regulations (or updates to the regulations). The user may select a protocol 332 related to consumer hair clippers in the United States. In response, the computing device may display an interface 340 as depicted in FIG. 3E.

The interface 340 may identify a regulation 341 (the Consumer Product Safety Act) that was recently updated and that may apply to the consumer hair clipper protocol 332. The user may select whether the regulation 341 applies to the consumer hair clipper protocol 332 by using a star rating system 342, as discussed with respect to FIG. 2D. After the user selects a rating in the star rating system 342, the computing device may associate (or not associate) the regulation 341 with the consumer hair clipper protocol 332.

Figure 4:
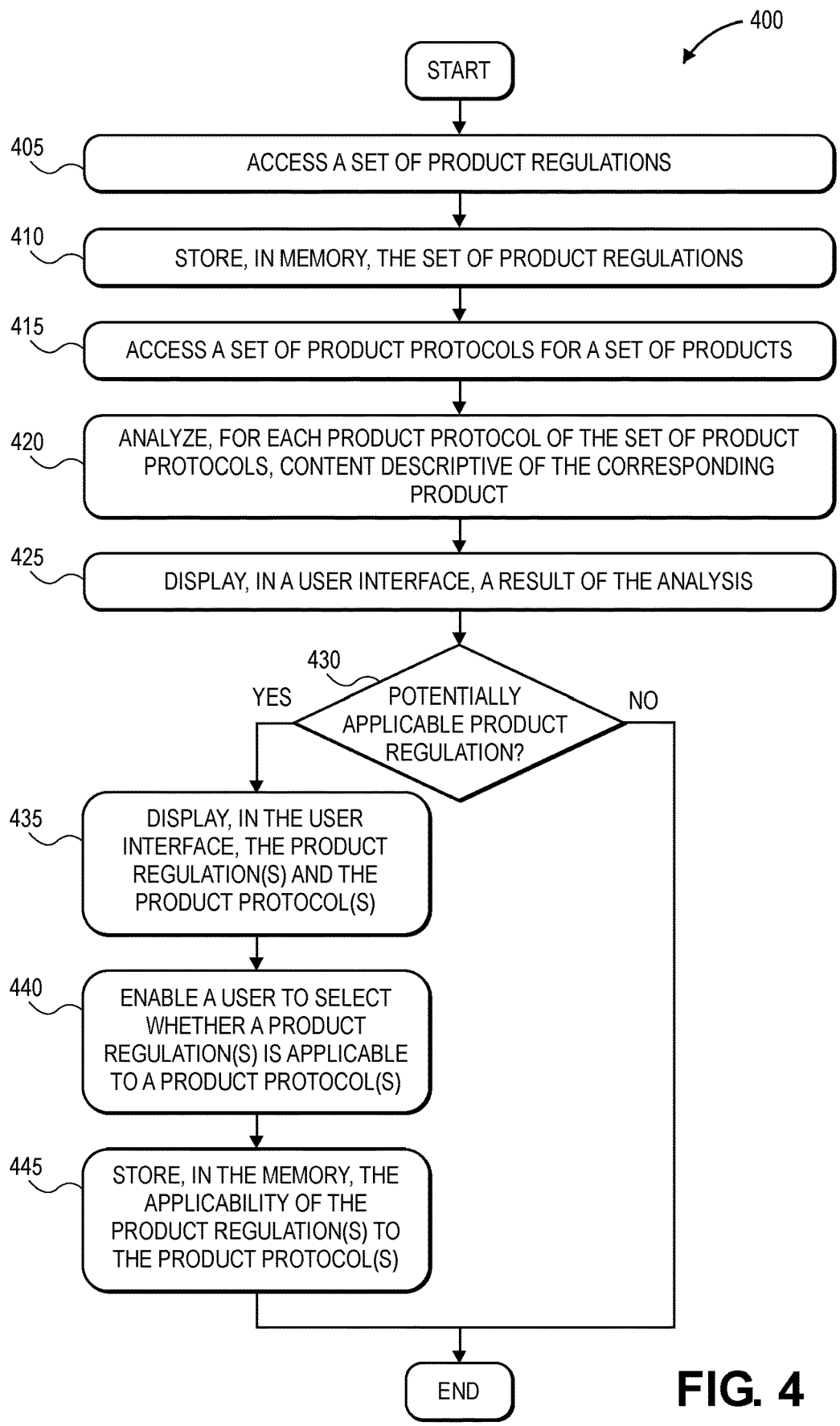
FIG. 4 is an example flowchart associated with dynamically determining applicable product regulations, in accordance with some embodiments.

FIG. 4 depicts is a block diagram of an example method 400 for dynamically determining product regulations that are applicable to product protocols. The method 400 may be facilitated by an electronic device (such as the server computer 115 or components associated with the protocol aggregator platform as discussed with respect to FIGS. 1A and 1B) that may be in communication with additional devices and/or data sources.

The method 400 may begin when the electronic device accesses (block 405) a set of product regulations. In embodiments, the electronic device may receive the set of product regulations as new or updated product regulations from one or more sources (e.g., the regulation-related data source(s) 116 as discussed with respect to FIG. 1A).

The electronic device may store (block 410), in memory, the set of product regulations. In embodiments, the electronic device may store the set of product regulations in the memory as part of a machine learning model. The electronic device may access (block 415) a set of product protocols for a set of products. In embodiments, the electronic device may receive the set of product protocols associated with new or existing products from one or more sources (e.g., the product-related data source(s) 117 as discussed with respect to FIG. 1A). Further, each product protocol of the set of product protocols may include content descriptive of a corresponding product of the set of products.

The electronic device may analyze (block 420), for each product protocol of the set of product protocols, the content descriptive of the corresponding product. In analyzing each product protocol, the electronic device may analyze the content using the stored machine learning model built from the set of product regulations. The electronic device may display (block 425), in a user interface, a result of the analysis. In embodiments, the electronic device may display, in the user interface, indications of any of the product protocols and/or the product regulations.

In analyzing the content descriptive of the corresponding product, the electronic device may determine (block 430), for each product protocol, whether there is a product regulation(s) that is potentially applicable. If there are no potentially applicable product regulations ("NO"), processing may end or proceed to other functionality. If there is a potentially applicable product regulation(s) ("YES"), processing may proceed to block 435.

At block 435, the electronic device may display, in the user interface, the product regulation(s) and the product protocol(s), such as any product regulation(s) that is potentially relevant to the corresponding product protocol(s). In embodiments, the electronic device may receive, via the user interface, a selection to view each product protocol having at least one product regulation that is potentially applicable, and the electronic device may display information associated with the selected product protocol(s) and the potentially applicable product regulation(s). In one scenario, the electronic device may display, in the user interface, a set of test lines associated with a selected product protocol, and for each test line of the set of test lines, at least one product regulation that is applicable to the test line.

The electronic device may enable (block 440) a user to select whether a product regulation(s) is applicable to a product protocol(s). Based on the selection of block 440, the electronic device may store (block 445), in the memory, the applicability of the product regulation(s) to the product protocol(s). Accordingly, the electronic device may use the updated machine learning model that reflects accurate regulation applicability in subsequent analyses.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for dynamically determining product regulations that are applicable to product protocols, the method comprising:
    training, by a processor, a machine learning model using a set of training data;
    accessing, by the processor, a set of product regulations issued by a set of regulatory agencies to regulate products in specified jurisdictions;
    storing, in memory, the set of product regulations and the machine learning model;
    accessing, by the processor, a set of product protocols for a set of products, wherein each product protocol of the set of product protocols comprises content descriptive of a corresponding product of the set of products;
    analyzing, by the processor using the trained machine learning model for each product protocol of the set of product protocols, the content descriptive of the corresponding product to determine that at least one product regulation of the set of product regulations is potentially applicable to the product protocol;
    displaying, in a user interface for each product protocol having the at least one product regulation that is potentially applicable, an indication of the product protocol, based on the analyzing;
    displaying, in the user interface, (i) a set of test lines associated with the indicated product protocol, and (ii) for each test line of the set of test lines, the at least one product regulation of the set of product regulations that is potentially applicable to the test line;
    identifying, in the user interface, a set of categories for the set of test lines having various applicable regulations, wherein the set of categories comprises at least one of: labeling and document review or physical characteristics of labeling and document review;
    receiving a first selection, made via the user interface and for each product protocol having the at least one product regulation that is potentially applicable, of whether the at least one product regulation is applicable to that product protocol;
    updating, by the processor, the set of training data to include (i) a result of the analyzing, and (ii) for each product protocol having the at least one product regulation that is potentially applicable, the first selection of whether the at least one product regulation is applicable to that product protocol;
    retraining, by the processor, the machine learning model with the set of training data that was updated;
    re-analyzing, by the processor using the retrained machine learning model, the at least one product regulation of the set of product regulations to determine updates associated therewith;
    displaying, in the user interface, information associated with the result of the re-analyzing including (i) an indication of the at least one product regulation and the updates associated therewith, (ii) a first filter to filter a date range associated with the at least one product regulation, (iii) a second filter to filter the specified jurisdictions, and (iv) a third filter to filter at least one type of the set of products;
    receiving, via the user interface, a second selection of at least one of the first filter, the second filter, or the third filter; and
    filtering, in the user interface, the indicated at least one product regulation according to the second selection of the at least one of the first filter, the second filter, or the third filter.

2. The computer-implemented method of claim 1, wherein displaying the indication of the product protocol comprises:
    receiving, via the user interface, a third selection to view each product protocol having the at least one product regulation that is potentially applicable; and
    in response to receiving the third selection, displaying, in the user interface for each product protocol having the at least one product regulation that is potentially applicable, (i) the indication of the at least one product regulation, and (ii) the indication of the product protocol.

3. The computer-implemented method of claim 1, further comprising:
    storing, in the memory based on the first selection of whether the at least one product regulation is applicable to that product protocol, the set of product protocols to reflect applicability to the set of product regulations.

4. A system for dynamically determining product regulations that are applicable to product protocols, the system comprising:
    a memory storing instructions;
    a user interface; and
    a processor interfaced with the memory and the user interface, configured to execute the instructions to cause the processor to:
        train a machine learning model using a set of training data,
        access a set of product regulations issued by a set of regulatory agencies to regulate products in specified jurisdictions,
        cause the memory to store the set of product regulations and the machine learning model,
        access a set of product protocols for a set of products, wherein each product protocol of the set of product protocols comprises content descriptive of a corresponding product of the set of products,
        analyze, using the trained machine learning model for each product protocol of the set of product protocols, the content descriptive of the corresponding product to determine that at least one product regulation of the set of product regulations is potentially applicable to the product protocol,
        cause the user interface to display, for each product protocol having the at least one product regulation that is potentially applicable, an indication of the product protocol, based on the analyzing,
        cause the user interface to display (i) a set of test lines associated with the indicated product protocol, and (ii) for each test line of the set of test lines, the at least one product regulation of the set of product regulations that is potentially applicable to the test line,
        cause the user interface to identify a set of categories for the set of test lines having various applicable regulations, wherein the set of categories comprises at least one of: labeling and document review or physical characteristics of labeling and document review,
        receive a first selection, made via the user interface and for each product protocol having the at least one product regulation that is potentially applicable, of whether the at least one product regulation is applicable to that product protocol, update the set of training data to include (i) a result of the analyzing, and (ii) for each product protocol having the at least one product regulation that is potentially applicable, the first selection of whether the at least one product regulation is applicable to that product protocol, retrain the machine learning model with the set of training data that was updated, re-analyze, using the retrained machine learning model, the at least one product regulation of the set of product regulations to determine updates associated therewith, cause the user interface to display information associated with the result of the re-analyzing including (i) an indication of the at least one product regulation and the updates associated therewith, (ii) a first filter to filter a date range associated with the at least one product regulation, (iii) a second filter to filter the specified jurisdictions, and (iv) a third filter to filter at least one type of the set of products, receive, via the user interface, a second selection of at least one of the first filter, the second filter, or the third filter, and cause the user interface to filter the indicated at least one product regulation according to the second selection of the at least one of the first filter, the second filter, or the third filter.

5. The system of claim 4, wherein the processor causes the user interface to display, for each product protocol having the at least one product regulation that is potentially applicable, the indication of the product protocol in response to receiving, via the user interface, a third selection to view each product protocol having the at least one product regulation that is potentially applicable.

6. The system of claim 4, wherein the processor is configured to execute the instructions to further cause the processor to:

based on the first selection of whether the at least one product regulation is applicable to that product protocol, cause the memory to store the set of product protocols to reflect applicability to the set of product regulations.

7. A non-transitory computer-readable storage medium having stored thereon a set of instructions, executable by a processor, for dynamically determining product regulations that are applicable to product protocols, the instructions comprising:

instructions for training, by a processor, a machine learning model using a set of training data;

instructions for accessing a set of product regulations issued by a set of regulatory agencies to regulate products in specified jurisdictions;

instructions for storing, in memory, the set of product regulations and the machine learning model;

instructions for accessing a set of product protocols for a set of products, wherein each product protocol of the set of product protocols comprises content descriptive of a corresponding product of the set of products;

instructions for analyzing, using the trained machine learning model for each product protocol of the set of product protocols, the content descriptive of the corresponding product to determine that at least one product regulation of the set of product regulations is potentially applicable to the product protocol;

instructions for displaying, in a user interface for each product protocol having the at least one product regulation that is potentially applicable, an indication of the product protocol, based on the analyzing;

instructions for displaying, in the user interface, (i) a set of test lines associated with the indicated product protocol, and (ii) for each test line of the set of test lines, the at least one product regulation of the set of product regulations that is potentially applicable to the test line;

instructions for identifying, in the user interface, a set of categories for the set of test lines having various applicable regulations, wherein the set of categories comprises at least one of labeling and document review or physical characteristics of labeling and document review;

instructions for receiving a first selection, made via the user interface and for each product protocol having the at least one product regulation that is potentially applicable, of whether the at least one product regulation is applicable to that product protocol;

instructions for updating the set of training data to include (i) a result of the analyzing, and (ii) for each product protocol having the at least one product regulation that is potentially applicable, the first selection of whether the at least one product regulation is applicable to that product protocol;

instructions for retraining the machine learning model with the set of training data that was updated;

instructions for re-analyzing, using the retrained machine learning model, the at least one product regulation of the set of product regulations to determine updates associated therewith;

instructions for displaying, in the user interface, information associated with the result of the re-analyzing including (i) an indication of the at least one product regulation and the updates associated therewith, (ii) a first filter to filter a date range associated with the at least one product regulation, (iii) a second filter to filter the specified jurisdictions, and (iv) a third filter to filter at least one type of the set of products;

instructions for receiving, via the user interface, a second selection of at least one of the first filter, the second filter, or the third filter; and instructions for filtering, in the user interface, the indicated at least one product regulation according to the second selection of the at least one of the first filter, the second filter, or the third filter.

8. The non-transitory computer-readable storage medium of claim 7, wherein the instructions for displaying the indication of the product protocol comprise:

instructions for receiving, via the user interface, a third selection to view each product protocol having the at least one product regulation that is potentially applicable; and instructions for, in response to receiving the third selection, displaying, in the user interface for each product protocol having the at least one product regulation that is potentially applicable, (i) the indication of the at least one product regulation, and (ii) the indication of the product protocol.

9. The non-transitory computer-readable storage medium of claim 7, wherein the instructions further comprise:

instructions for storing, in the memory based on the first selection of whether the at least one product regulation is applicable to that product protocol, the set of product protocols to reflect applicability to the set of product regulations.

* * * * *